April 1, 1969  K. O. MOSER  3,435,478
CONDUIT CLEANING TOOL
Filed March 23, 1967
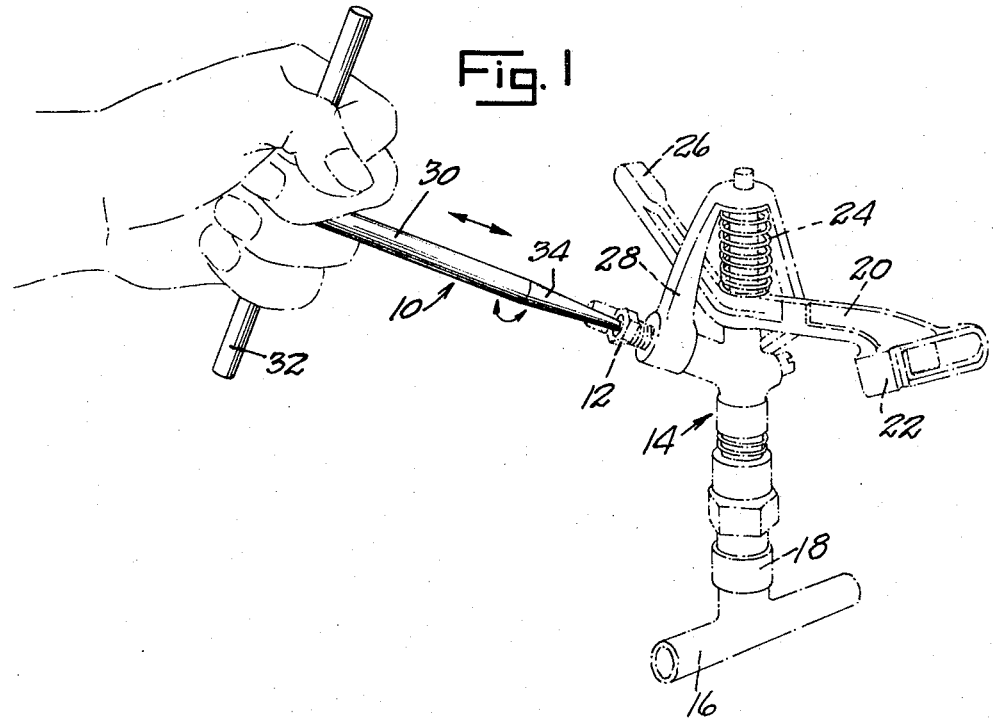
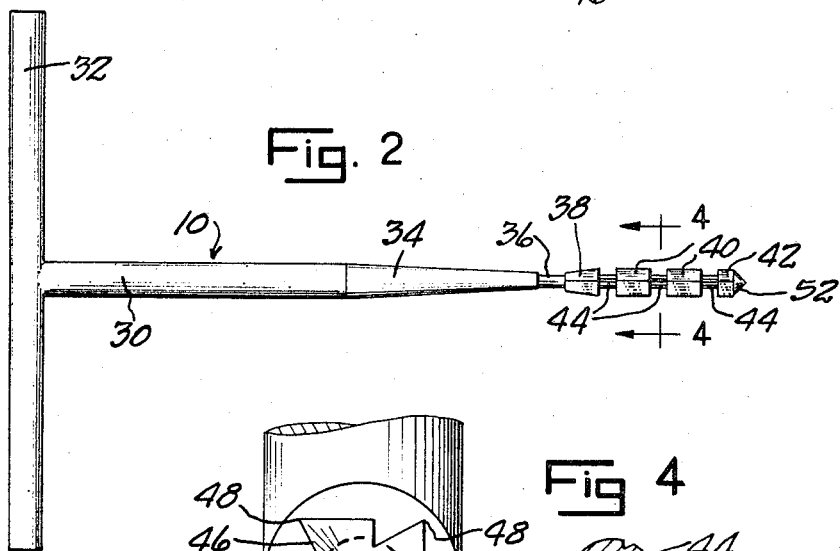
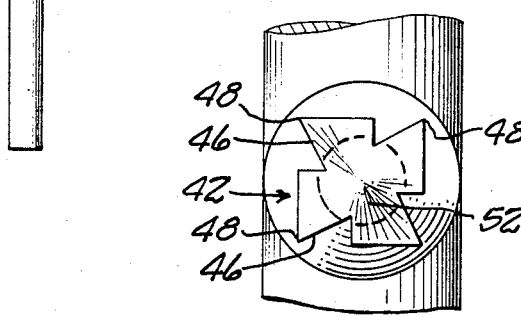
INVENTOR.
KARL O. MOSER
BY *Eugene C. Knoblock*
ATTORNEY

United States Patent Office 3,435,478
Patented Apr. 1, 1969

3,435,478
CONDUIT CLEANING TOOL
Karl O. Moser, R.R. 1, Box 292,
Coloma, Mich. 49038
Filed Mar. 23, 1967, Ser. No. 625,369
Int. Cl. F28g *3/10;* B08b *9/00;* B23b *51/68*
U.S. Cl. 15—104.1                    7 Claims

ABSTRACT OF THE DISCLOSURE

A conduit cleaning tool reciprocable and rotatable in a conduit and having a shank provided with longitudinally spaced reduced neck portions separating a plurality of configured parts each having a plurality of circumferentially spaced longitudinally extending ridges, longitudinal grooves between the ridges and abrupt trailing shoulders.

Specification

This invention relates to improvements in conduit cleaning tools. More particularly, it relates to a tool for cleaning sprinkler heads, such as irrigation sprinkler heads.

Many conduits which are characterized by a relatively small open-ended bore are exposed to movement of dirt and other foreign material therearound. When such conduits are used only intermittently for the discharge of liquid, they tend to accumulate foreign material therein and to become clogged. This is particularly true of sprinkler heads, such as irrigation sprinkler heads used on lawns, and in orchards, garden plots and farms. The accumulated material includes dirt, grasses, and small twigs. As a result of such accumulation and clogging, it is necessary from time to time to clean out the accumulated clogging material. Frequently, it has been necessary heretofore to disassemble the device having the clogged part, such as an irrigation sprinkler. Such disassembly requires a great amount of time and the use of several tools.

It is the primary object of this invention to provide a tool which can be used effectively to dislodge clogging accumulations within a conduit, such as a sprinkler outlet tube, and to remove such accumulations rapidly and effectively.

A further object is to provide a device of this character wherein a tool shank has a plurality of longitudinally spaced reduced diameter or neck portions separated by ridged portions having circumferentially spaced grooves therein for passage of clogging material dislodged in the use of the tool.

A further object is to provide a device of this character comprising a hand-tool having a plurality of longitudinally spaced material-dislodging portions each characterized by a plurality of circumferentially spaced longitudinal ridged portions separated by longitudinal grooves and having a tapered leading end.

Other objects will be apparent from the following specification.

In the drawing:
FIG. 1 is a perspective view illustrating the manner in which the tool is used.
FIG. 2 is a plan view of the tool.
FIG. 3 is an enlarged end view of the tool as viewed from the right in FIG. 2.
FIG. 4 is a transverse sectional view taken on line 4—4 of FIG. 2.

Referring to the drawing which illustrates the preferred embodiment of the invention, the numeral 10 designates my new tool. In FIG. 1, the tool is illustrated in use for the purpose of cleaning the discharge outlet conduit or nozzle 12 of an irrigation sprinkler head 14 connected to a water line 16. The sprinkler may be of the type wherein the head 14 is rotatably mounted upon a fitting 18 and carries an arm 20 rotating on a vertical axis and urged by spring 24 toward a position at which one end portion 22 intercepts water discharging from the outlet 12. Arm 20 is journaled at its center and preferably has its end 26 weighted. The arm 20 is limited in its rotative stroke by engagement with an arching portion 28 carried by the head 14.

The construction of the sprinkler head is such that the force of water discharging from nozzle 12 against the arm end 22 rotates the arm 20 against the action of the spring 24, following which the spring returns the arm end 22 toward the nozzle 12. In one direction of this constantly alternating swinging movement, the arm 20 applies a hammer blow or impact upon the arching part 28 of sufficient force to cause limited rotation of the sprinkler head. Thus, progressive operation of the sprinkler will cause discharge of water in a complete circle therearound, as a result of repeated blows or impacts by the swinging arm 20. The conduit or nozzle 12 is preferably inclined upwardly to provide desired trajectory of the stream of water discharged from the sprinkler and is open-ended. The sprinkler is used periodically, and substantial periods of time may intervene between successive uses during which periods of nonuse grasses, twigs and other foreign material may be blown into or otherwise caused to lodge in the nozzle.

My improved clean-out tool has an elongated shank 30 at one end of which is secured a suitable handle 32. The shank is of a diameter approximately equal to or greater than the bore of the nozzle or conduit 12 and has integrally formed thereon at its free or leading end portion, spaced outwardly from a tapered intermediate portion 34 and a reduced neck portion 36, a plurality of longitudinally spaced configured clogged-material-releasing portions 38, 40 and 42 which are separated by reduced diameter neck portions 44.

Each of the portions 40 and 42 is preferably of the cross-sectional configuration best illustrated in FIG. 3, being characterized by an overall noncircular cross-sectional shape, such as triangular, square, pentagonal or hexagonal, whose faces are interrupted by grooves 46 or are indented. Adjacent faces so cooperate, or one surface of each groove cooperates with the surface of the adjacent face as to define a longitudinally extending ridge 48 between each pair of adjacent faces. The ridges 48 and grooves or indentations 46 may be straight or may have a slight helical lead. The grooves 46 or indentations are preferably aligned in the respective portions 38, 40 and 42. In the construction shown, the spacing of the bottom of each groove 46 from the axis of the tool is preferably less than the diameter of the reduced neck portions 36 and 44, so that grooves 50 are formed in such neck portions aligned with the grooves 46. Each of the portions 40 and 42 may include end walls remote from tip or free end of the tool which are undercut, but this is not essential and the ends of such portions may be formed to define abrupt shoulders; for example, substantially flat in a plane normal to the tool shank.

The leading release portion 42 of the tool has a tapered tip 52 which may be of pyramidal or conical shape and which is preferably characterized by a length approximately equal to the cross-sectional dimension of the remaining or untapered part of the released portion 42 and to the diameter of the bore of the conduit or nozzle. The relese portion 38 is preferably tapered or reduced toward the neck 36 but otherwise has substantially the same cross-sectional configuration as the portions 40 and 42.

In the use of the tool, the leading end of its shank is inserted in the conduit or nozzle and the tool is manipulated by a combination of rotative and axial movement thereof. The tool preferably has a dimension across opposed ridges 48 thereof which substantially conforms to the bore of the conduit or nozzle, so that rotation of the tool will bring any adhered foreign material within the tool into the range of action of the ridges 48, thus dislodging the clogged material. As the material is dislodged, it is free to pass between the tube and the faces of the tool and also through the grooves 46 or indentations. Manipulation of the tool causes dislodged clogging material to pass lengthwise of the tool; to and through the reduced neck portions 44, and also to and through grooves 46 of the succeeding portions 40 and 38. The pointed tip 52 of the tool facilitates penetration of the clogging material and diversion thereof into the clearance passages around the tool between the ridges 48 thereof.

The tool may be withdrawn from time to time to expedite removal of released clogging material. The dislodged material anchors at the abrupt or undercut shoulders of portions 40 and 42 and around the various neck portions 44. In most instances, after a few insertions of the tool and manipulations thereof in the conduit, the conduit or nozzle will be opened and the clogging material remaining therein will be released or freed, so that when water is next forced under pressure into the nozzle the loosened material will be flushed therefrom.

While the preferred embodiment of the invention has been illustrated and described, it will be understood that changes in the construction may be made within the scope of the appended claims without departing from the spirit of the invention.

I claim:

1. A conduit clean-out tool for releasing and removing foreign material within and clogging the conduit bore, comprising an elongated shank having a plurality of longitudinally spaced reduced diameter neck portions in one end portion thereof separating integral configured shank portions, said configured shank portions each having a noncircular cross-sectional configuration characterized by spaced ridges and intervening face portions which extend the length thereof, each face portion having a groove therein which parallels at least one ridge-defining edge of said face portion and extends the full length thereof and which has a depth extending substantially to said neck portions, the distance between opposite ridges of each configured shank portion being slightly less than the diameter of said conduit bore so as to provide for a slide fit of the configured shank portions within said conduit bore, the inner ends of said configured shank portions constituting abrupt shoulders, and a hand grip portion carried by said shank portion.

2. A conduit clean-out tool as defined in claim 1, wherein
one of said configured shank portions is located at the leading end of the tool shank and has a tapered tip.

3. A conduit clean-out tool as defined in claim 1, wherein
the shank of said tool tapers towards the innermost neck portion.

4. A conduit clean-out tool as defined in claim 1, wherein
the defining groove parts of each face portion are V-shaped, one surface of each V-shaped groove extending in acute angled relation to an adjacent face portion to define a ridge.

5. A conduit clean-out tool as defined in claim 1, wherein
the ridges of said configured shank portions are longitudinally aligned,
each face portion having a groove with a surface cooperating with an adjacent face portion to define a ridge, the grooves of said configured shank portions being aligned.

6. A conduit clean-out tool as defined in claim 1, wherein the shoulders at the inner ends of said configured shank portion are undercut.

7. A conduit clean-out tool as defined in claim 1, wherein the innermost configured shank portion is tapered with the ridges thereof converging rearwardly.

References Cited

UNITED STATES PATENTS

| 2,149,810 | 3/1939 | Kliewer | 15—104.05 X |
| 2,682,792 | 7/1954 | Donnelly | 77—72 |

FOREIGN PATENTS

| 324,302 | 3/1903 | France. |
| 225,828 | 6/1943 | Switzerland. |

EDWARD L. ROBERTS, *Primary Examiner.*

U.S. Cl. X.R.

77—72